United States Patent
Ramsesh

(10) Patent No.: US 8,957,631 B2
(45) Date of Patent: Feb. 17, 2015

(54) SELF-POWERED WIRELESS INDUCTION SENSOR

(75) Inventor: Anilkumar Ramsesh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 925 days.

(21) Appl. No.: 13/110,565

(22) Filed: May 18, 2011

(65) Prior Publication Data

US 2012/0293115 A1    Nov. 22, 2012

(51) Int. Cl.
| | |
|---|---|
| G01B 7/30 | (2006.01) |
| H02J 7/00 | (2006.01) |
| G01D 5/20 | (2006.01) |
| G01P 3/488 | (2006.01) |
| G01P 21/02 | (2006.01) |
| H02J 7/32 | (2006.01) |

(52) U.S. Cl.
CPC .............. *G01D 5/2013* (2013.01); *G01P 3/488* (2013.01); *G01P 21/02* (2013.01); *H02J 7/32* (2013.01)
USPC ........................ 320/108; 320/128; 324/207.25

(58) Field of Classification Search
CPC ....................................................... H02J 7/025
USPC ........................................................ 320/108
See application file for complete search history.

(56) References Cited

U.S. PATENT DOCUMENTS

| | | |
|---|---|---|
| 6,515,878 B1 | 2/2003 | Meins et al. |
| 7,256,505 B2 | 8/2007 | Arms et al. |
| 2008/0047363 A1* | 2/2008 | Arms et al. ................. 73/862 |
| 2008/0204005 A1 | 8/2008 | Wang |
| 2011/0210608 A1* | 9/2011 | O'Brien et al. .............. 307/31 |
| 2012/0043944 A1* | 2/2012 | Nguyen et al. ............. 320/163 |
| 2012/0156034 A1* | 6/2012 | Sabannavar et al. .......... 416/1 |

OTHER PUBLICATIONS

International Search Report and Written Opinion, dated Nov. 30, 2012, for counterpart WO Application No. PCT/US2012/036060, 10 pages.

* cited by examiner

*Primary Examiner* — Edward Tso
*Assistant Examiner* — Ahmed Omar
(74) *Attorney, Agent, or Firm* — Thompson Patent Law; Craige Thompson

(57) ABSTRACT

An induction sensor generates speed data based on a frequency of the change in magnetic flux within the sensor and powers sensor circuitry by recharging a power source using at least a portion of the electrical voltage induced by the change in magnetic flux. In this manner, the induction sensor may generate its own power to sense and transmit data. To optimize the recharging power available from the induced electrical voltage, the sensor may also include a variable load. This variable load may be automatically controlled by the sensor based on the induced voltage and/or current. The induction sensor may also wirelessly transmit generated data. In addition, the sensor may, after shutting down, automatically power up in response to the change in magnetic flux exceeding a start-up threshold.

20 Claims, 13 Drawing Sheets

SELF-POWERED WIRELESS INDUCTION SENSOR

TECHNICAL FIELD

This disclosure relates to sensors, and more particularly to inductive sensors.

BACKGROUND

Inductive sensors, e.g. variable reluctance speed sensors, use changes in magnetic flux to detect the rate at which a target moves past the sensor. The inductive sensor generally includes a permanent magnet, a pole piece or core and a coil of wire with two connections. When a tooth of a ferromagnetic gear, for example, turns past the sensor, an electromagnetic force (EMF) is induced in the coil and an electric current is driven when the EMF is connected to a load. The voltage from the EMF is induced and directly proportional to the rate of change of the magnetic flux. In the example of a rotating gear, the rotational speed is reflected on a periodic interval between the zero points of the electrical voltage and/or electrical current.

Inductive sensors may be used for incremental measurement of rotational speed, linear speed, vibrations of a structure, angular position, proximity of a target to the sensor, or any other similar characteristic of the target that passes structures periodically near the sensor. For example, inductive sensors may be used to detect the rotational speed of a crankshaft or flywheel of an internal combustion engine. The speed of the crankshaft sensed by the sensor may be used to control operation of the engine.

SUMMARY

In general, the disclosure describes devices for inductive sensing and independently generating operational power. The power may be generated from at least a portion of the electrical voltage induced by the change in magnetic flux also used for sensing. This generated power may be stored, used to generate sensed data, and used to wirelessly transmit the data. Since wireless sensors need electrical energy to operate (e.g., transmit and receive wireless communication signals, batteries may not provide a sufficient amount of power to keep these wireless sensors operational over an adequate duration of time. Therefore, scavenging energy already produced by the sensor may allow the sensor to operate independently for long durations of time.

Since the electrical voltage generated by the rate of change in magnetic flux is generally dependent upon the speed of the target structure relative to the sensor, the available power may fluctuate. The sensor may therefore include a variable load that adjusts the recharging power (e.g., to optimize or maximize the recharging power) available from the induced electrical current. This variable load may be automatically controlled by the sensor based on a magnitude of the induced voltage and/or the frequency of the change in magnetic flux. If power is drained from a power source, e.g., a battery or capacitor, the sensor may shut down. However, the sensor may automatically power up in response to the change in magnetic flux exceeding a start-up threshold.

In one example of the disclosure, a sensor includes an induction module configured to generate an electrical voltage induced by a change in magnetic flux within the induction module, a sensing module configured to generate data based on a frequency of the change in magnetic flux, a wireless telemetry module configured to transmit the data, a rechargeable power source, and an energy scavenging module configured to recharge the rechargeable power source using at least a portion of the electrical voltage induced by the change in magnetic flux.

In another example of the disclosure, a method includes inducing an electrical voltage from a change in magnetic flux within an induction module of a sensor in response to a passing target structure, generating data based on a frequency of the change in magnetic flux, wirelessly transmitting the data, and recharging a rechargeable power source using at least a portion of the electrical voltage induced by the change in magnetic flux.

In an additional example of the disclosure, a speed sensing device includes means for inducing an electrical voltage from a change in magnetic flux in response to a passing target structure, means for generating data based on a frequency of the change in magnetic flux, means for wirelessly transmitting the data, and means for recharging a rechargeable power source using at least a portion of the electrical voltage induced by the change in magnetic flux.

The details of one or more implementations are set forth in the accompanying drawings and the description below. Other features, objects, and advantages will be apparent from the description and drawings, and from the claims.

DETAILED DESCRIPTION

Figure 1:
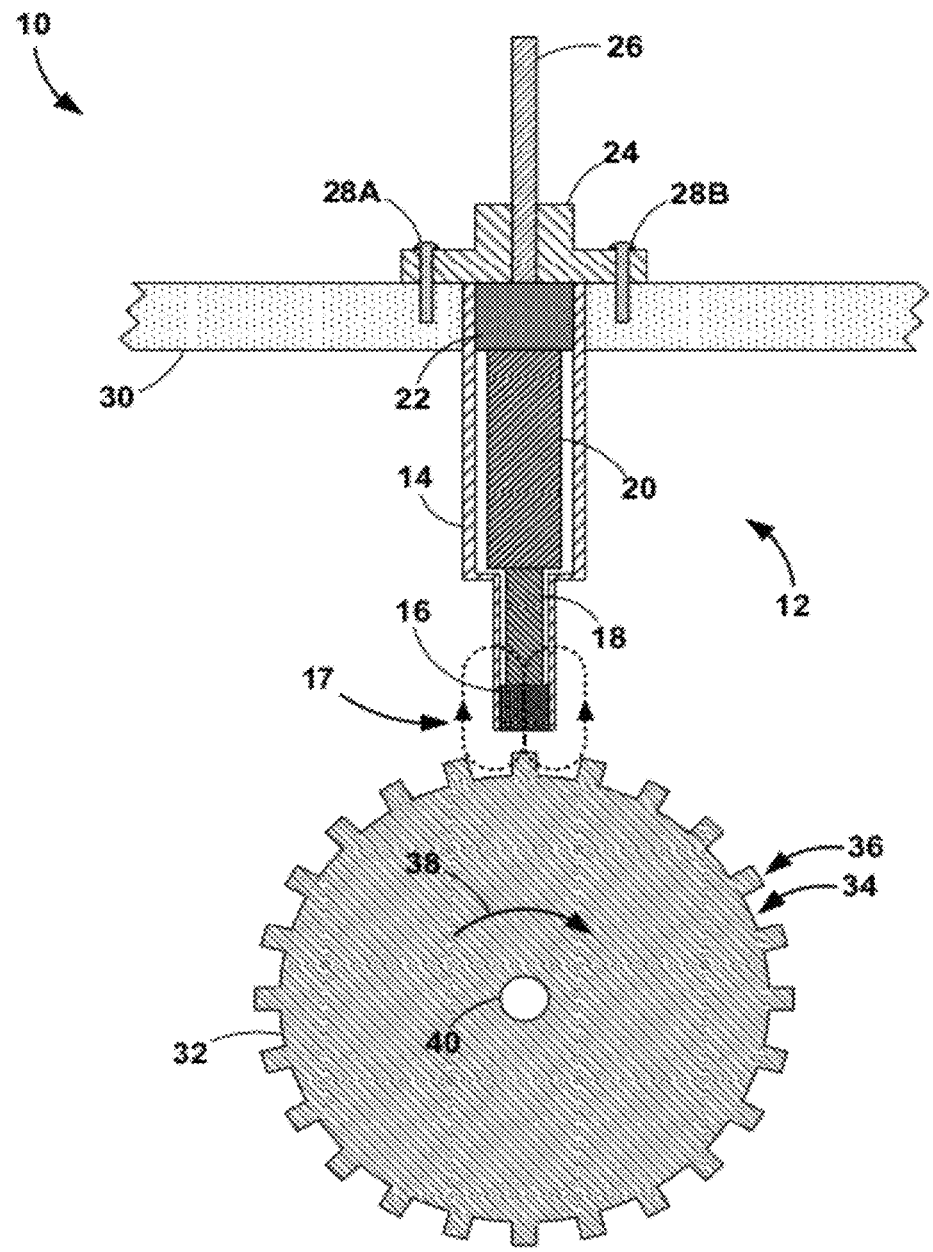
FIG. 1 is a conceptual diagram of an example system that includes an inductive sensor that senses a speed of a target.

In general, the disclosure describes devices for inductive sensing and independently generating operational power. Inductive sensors may be used to sense the speed and/or position of a wide variety of targets. For example, inductive sensors may be used to measure the angular speed of a crankshaft, flywheel, conveyor belt, or any other ferromagnetic structure. Typically, inductive sensors are wired to a power supply and a control system that uses generated signals from the sensors. Some systems, however, may benefit from wireless inductive sensors.

Wireless sensors may be beneficial, but wirelessly transmitting sensed data may provide little advantage if the sensor still requires wiring to a power source that drives the components of the wireless sensor. And, since wireless telemetry consumes a relatively large quantity of energy, a self contained battery within the inductive sensor may not be capable of sustaining sensor operation for a sufficient duration of time. This consumption of power may be particularly apparent in applications where the system requires continuous wireless transmission of the data (e.g., an engine control system that uses crankshaft speed to manage engine operation).

An inductive sensor is described herein that generates sensing data in addition to generating operational power scavenged from the inducted electrical voltage. Since a change in magnetic flux is caused by a target passing near a magnet of the inductive sensor, an electrical voltage and current is induced in a wire coiled about an axis of the magnet. The sensor may detect the speed of the passing target based on the frequency of the change in electrical voltage or current in the circuit. However, at least a portion of the electrical voltage from the induction may also be used to recharge a power source of the sensor. This rechargeable power source may then be used to provide operational power to the modules, e.g., circuitry, of the inductive sensor. In this manner, the inductive sensor may self generate required operational power. Although an electrical voltage is generally described herein as being induced in the sensor in response to the passing target, an electrical current is also induced when the coil is connected to a load.

By generating the necessary power to function, the inductive sensor may continually, and independently, transmit data to a base station via wireless telemetry. This data may be speed data that is generated by a sensing module based on the frequency of the change in magnetic flux. The sensor may additionally transmit an energy balance status that indicates an energy consumption of the sensor and/or a recharging rate with the energy scavenging scheme. In this manner, the system may monitor the health of the energy scavenging system for any potential problems that may render the sensor inoperable.

Generally, the electrical voltage generated by the change in magnetic flux may be dependent upon the speed of the target structure. The power available to recharge the power source may thus fluctuate and limit the recharging capacity of the sensor. An energy scavenging module of the sensor may instead include a variable load that adjusts the recharging power (e.g., to optimize or maximize the recharging power) available from the induced electrical voltage. A sensing module within the sensor may automatically control the variable load based on a magnitude of the induced voltage and/or the frequency of the change in magnetic flux. By varying the load on the energy scavenging module, the sensor may maximize the recharging rate over a wide variety of target speeds.

In some examples, a lack of induced electrical current (e.g., from a target with little or no movement) may allow the rechargeable power source of the inductive sensor to discharge such that the sensor powers down. In other words, the voltage of the power source may be reduced to where the circuitry of the sensor can no longer function. That lack of data may be inconsequential if the target is not moving. However, the sensor may automatically initiate a power up sequence in response to the change in magnetic flux exceeding a start-up threshold. Above the start-up threshold, an electrical current sufficient to support sensor operation may be induced.

FIG. 1 is a conceptual diagram of example system 10 that includes inductive sensor 12 that senses a speed of target 32. As shown in FIG. 1, system 10 includes sensor 12 positioned to detect movement of target 32. Target 32 may comprise a toothed gear that is part of an engine or vehicle in some examples. Target 32 may rotate about axis 40 in the direction of arrow 38. In some examples, target 32 may rotate opposite arrow 38, or in either direction. However, sensor 12 may not be capable of distinguishing between which direction target 32 rotates.

Target 32 may be constructed of a ferromagnetic material or other magnetic material (e.g., material that includes at least one of iron, nickel, and cobalt). In one example, target 32 includes multiple teeth 36 and gaps 34 interleaved around a perimeter of the circular target 32. Central opening 40 may be centered around the axis of target 32 and accept a shaft to connect target 32 to another structure, e.g., a crankshaft. Each tooth of teeth 36 may be a structure that is detectable by sensor 12 because of the difference in distance between teeth 36 and sensor 12 and between gaps 34 and sensor 12.

As will be described in more detail below, the physical changes between passing teeth 36 and gaps 34 relative to sensor 12 induces a change in magnetic flux within sensor 12 that is representative of when each of teeth 36 passes near sensor 12. Sensor 12 may calculate a speed of target 32 based on the frequency with which teeth 36 pass sensor 12. In other words, sensor 12 may calibrated such that the detected frequency is directly related to a speed or angular velocity of the specific target 32 based on an angular distance between the edge of each of teeth 32 or the gap width between teeth 36. If teeth 36 and/or gaps 34 vary in width to allow sensor 12 to also detect a position of target 32, the variation in teeth 36 frequency may also be used in the calibration. The speed at which target 32 rotates may representative of an angular velocity, rotational velocity, or linear velocity.

Sensor 12 is thus used in system 10 to sense the speed of target 32. A controller (e.g., control circuitry, a processor, or a computing device) may utilize the speed data from sensor 12 to control the speed of target 32 and/or other components that drive or are driven by target 32. Sensor 12 is generally described as an inductive sensor to detect movement of target 32. As shown in FIG. 1, sensor 12 includes sensor housing 14, induction module 16, sensing module 18, wireless telemetry module 20, energy scavenging module 22, mounting cap 24, and antenna 26. Sensor 12 is secured to support structure 30 with screws 28A and 28B. However, sensor 12 may be secured to support structure 30 with other fixation mechanisms, e.g., bolts, adhesives, pins, or even threaded portions of housing 14.

Housing 14 may secure the components of sensor 12 and protect sensor 12 from fluids, debris, heat, and other elements when coupled to mounting cap 24. Housing 14 may be constructed of any type of material suitable for the environment of system 10. For example, housing 14 may be constructed of a polymer that durable and resistant to changes in temperature, e.g., polyethylene, high density polyurethane, nylon, or any other polymers. In other examples, housing 14 may be constructed of a composite material or metal alloy. However, any material used to construct housing 14 may be selected to avoid any magnetic interference with induction module 16.

Induction module 16 is at least partially housed within a distal end of housing 14. In other words, induction module 16 may be positioned closest to target 32. Induction module 16 may include the components necessary to induce an electrical voltage in sensor 12 from teeth 36 passing near sensor 12. Generally, induction module 16 may include a magnetic core surrounded by a coil of wire. The magnetic core may include a permanent magnet that provides a magnetic field 17 around the coil of wire. As target 32 rotates in the direction of arrow 38, for example, the passing of teeth 36 near induction modules 16 changes the direction of magnetic flux of magnetic field 17 and induces an electrical current within the coil of wire. As is described herein, this electrical voltage may be used to sense the rotational speed of target 32 and generate power to operate sensor 12.

Magnetic field 17 is indicated by the provided partial magnetic field lines. These field lines may change direction as teeth 36 and gaps 36 alternate as target 32 rotates, indicating the change in magnetic flux caused by the increasing and decreasing distance between induction module 16 and the ferromagnetic material of target 32. The strength of magnetic field 17 may be determined by the magnetic core and selected to optimize or maximize the sensing and energy generating capabilities of sensor 12. In other examples, target 32 may be a linear structure that oscillates a chain or conveyor belt, or any other moveable structure.

Sensing module 18 is electrically coupled to induction module 16 and positioned completely within housing 14. Sensing module 18 may include electrical circuitry configured to detect the speed of target 32 based on the changing electrical current from induction module 16. In some examples, sensing module 18 may also include a processor that controls other electrical components of sensor 12, such as wireless telemetry module 20 and energy scavenging module 22.

Wireless telemetry module 20 may also be positioned completely within housing 14. Wireless telemetry module 20 may be electrically coupled to sensing module 18 and energy scavenging module 22. In addition, wireless telemetry module 20 may include circuitry for wirelessly transmitting data from sensor 12 to another computing device, e.g., an engine controller or other device that controls the rate of target 32 rotation. The transmitted data may include the speed of target 32, the charge status of a rechargeable battery within sensor 12, or any other information regarding the operation of sensor 12. Electrically coupled to wireless telemetry module 20 is antenna 26. Antenna 26 may allow the wireless signal to be transmitted away from other electrical components of sensor 12 and improve the distance over which the wireless signal may travel.

Sensor 12 may also include energy scavenging module 22. Energy scavenging module 22 may provide circuitry configured to recharge a rechargeable power source, e.g., a rechargeable battery or capacitor, within sensor 12. The rechargeable power source may be located within energy scavenging module 22 or elsewhere within sensor 12. Since induction module 16 produces an electrical current, energy scavenging module 22 may utilize, or scavenge, some of this electrical current to operate sensor 12 and recharge the power source. By providing a power source, sensor 12 may continue to sense the speed of target 32 and wirelessly transmit data even if target 32 is rotating at a rate too slow to produce operational power from target 32 alone.

As described herein, sensor 12 may include induction module 16 that may be configured to generate an electrical voltage in a coil of wire induced by a change in magnetic flux within induction module 16. Sensing module 18 may be configured to generate data, e.g., target speed data, based on a frequency of the change in magnetic flux. Wireless telemetry module 20 may be configured to transmit the data, and energy scavenging module 22 may be configured to recharge the rechargeable power source using at least a portion of the electrical current induced by the change in magnetic flux.

In some examples, energy scavenging module 22 may include a variable load that adjusts a recharging power (e.g., to optimize or maximize the recharging power) from the portion of the electrical voltage. The variable load may include a variable load resistor, voltage regulator, DC-to-DC converter, or any other structure capable of varying the load (or resistance) of the circuit used to provide recharging power to the rechargeable power source. In other examples, the load may be varied by utilizing a pulse width modulation (PWM) technique to vary the DC-to-DC converter operating point with variation of the pulse width of a shunt switch (e.g., shunt switch 84 of FIG. 7). In this manner the maximum or optimal power point for generating power can be tracked. In addition, sensing module 18, or another controller within sensor 12, may automatically control the variable load based on at least one of a magnitude of the induced electrical voltage and the frequency of the change in magnetic flux, e.g., the speed of target 32.

Induction module 16 may include a magnetic core. This magnetic core may include a permanent magnet that provides magnetic field 17. The magnetic core may also include a magnetic pole that is attached to the permanent magnet. The magnetic pole may be constructed of a ferromagnetic material and positioned distal of the permanent magnet such that the magnetic pole is disposed closest to target 32. A coil of wire may also be wound and or wrapped around at least a portion of the magnetic core. The frequency of the change in magnetic flux, and the resulting change in induced electrical voltage in the coil, may be based on an angular speed and tooth width of teeth 36. As described herein, target 32 may be a toothed gear that rotates adjacent to inductive module 16.

Sensor 12 may utilize wireless telemetry module 20 to transmit data that may include various information. For example, the transmitted data may include an energy balance status that indicates an energy consumption rate of sensor 12 and/or a recharging rate of the rechargeable power source within sensor 12. Sensor 12 may also provide a mechanism for dealing with extended operation without sufficient energy generation that depletes the power source. For example, after a voltage of the rechargeable power source drops below a shut-down threshold, sensing module 18 or energy scavenging module 22, may be configured to initiate a power up sequence upon the frequency of the change in magnetic flux exceeding a start-up threshold. In this manner, sensor 12 may be capable of automatically resuming sensing and wireless transmission of data once target 32 resumes a sufficiently fast speed.

Generally, target 32 is described herein as a toothed gear. However, sensor 12 may detect the angular velocity, rotational speed, linear speed, or other movements for different types of targets. In some examples, target 32 may be a crankshaft, a flywheel, a wheel, a transmission gear, an oscillating mechanism, a conveyor belt, or any other structure detectable by sensor 12. In other examples, target 32 may be a component of an engine, a transmission, a generator, a construction vehicle, construction equipment, a consumer vehicle, or any other larger system. In this manner, system 10 may be implemented in a wide variety of applications not limited to the examples provided herein.

Figure 2:
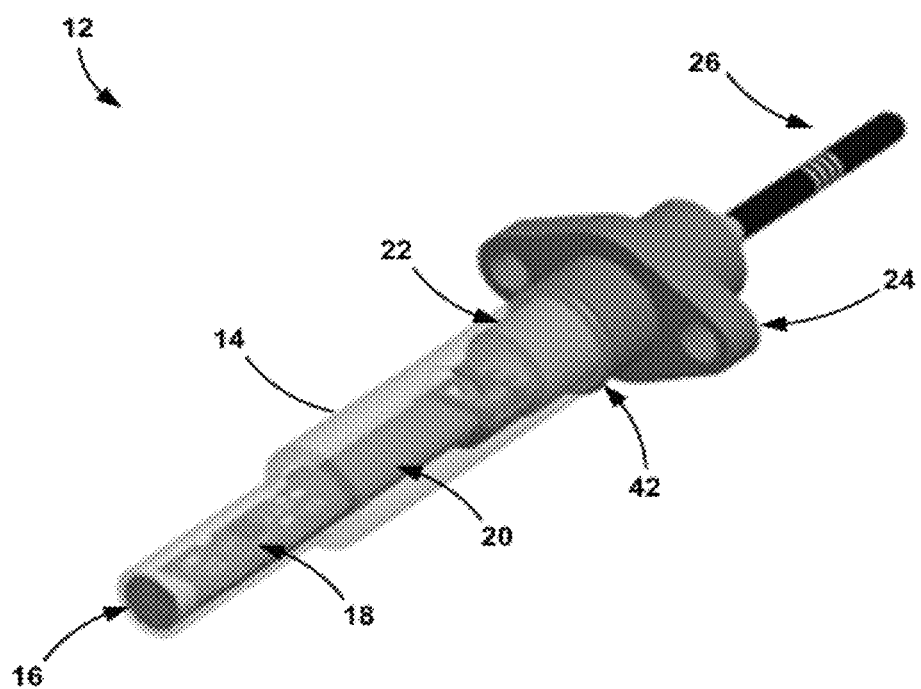
FIG. 2 is a perspective illustration of the sensor of FIG. 1.

FIG. 2 is a perspective illustration of sensor 12 described in FIG. 1. As shown in FIG. 2, housing 14 substantially surrounds and isolates the internal components of sensor 12. Mounting cap 24 also attaches to housing 14 to seal the internal components and provide a mounting point for sensor 12 to be mounted to a structure near the target with screws, bolts, rivets, adhesives, or any other binding mechanism. Seal 42 may be an o-ring, sealant, adhesive, or other structure that seals the inside of housing 14 from external contaminants, fluids, and gases. Mounting cap 24 may also provide structural support for antenna 26. Although sensor 12 is generally described as having a cylindrical shape, sensor 12 may be configured in any shape that supports required circuitry and allows induction module 16 to be positioned in close proximity to the intended target.

The internal components of sensor 12 may include induction module 16, sensing module 18, wireless telemetry module 20, and energy scavenging module 22. Induction module 16 may not reside completely within housing 14. A portion of induction module 16, e.g., the magnetic pole of the magnetic core, may be exposed to minimize the air gap between induction module 16 and the target and increase potential power generation within energy scavenging module 22. In other examples, the distal end of induction module 16 may be covered with a material different than the rest of housing 14 and selected to have little effect on the magnetic flux caused by the target while also sealing induction module 16 from contaminants or fluids in the environment surrounding sensor 12.

Figure 3A:
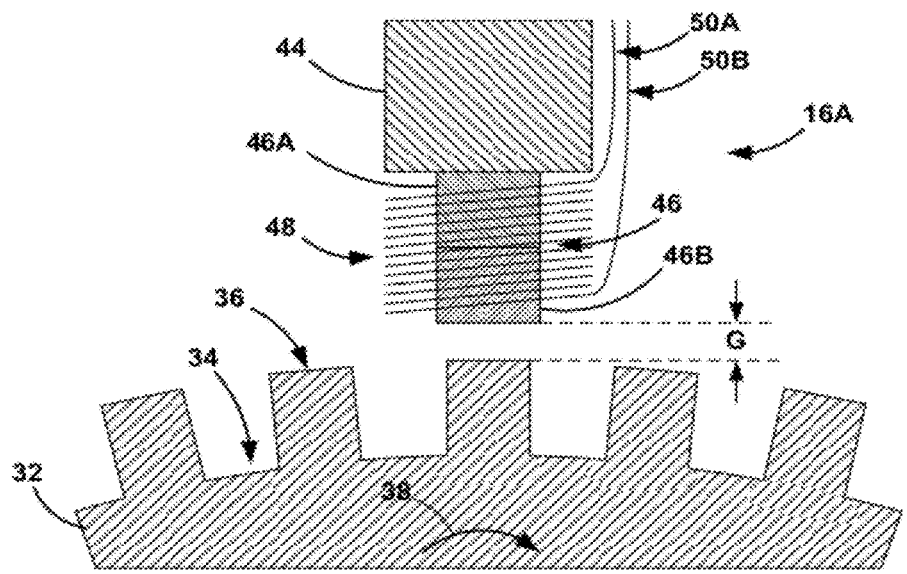
FIGS. 3A and 3B are conceptual diagrams of various induction module configurations.
Figure 3B:
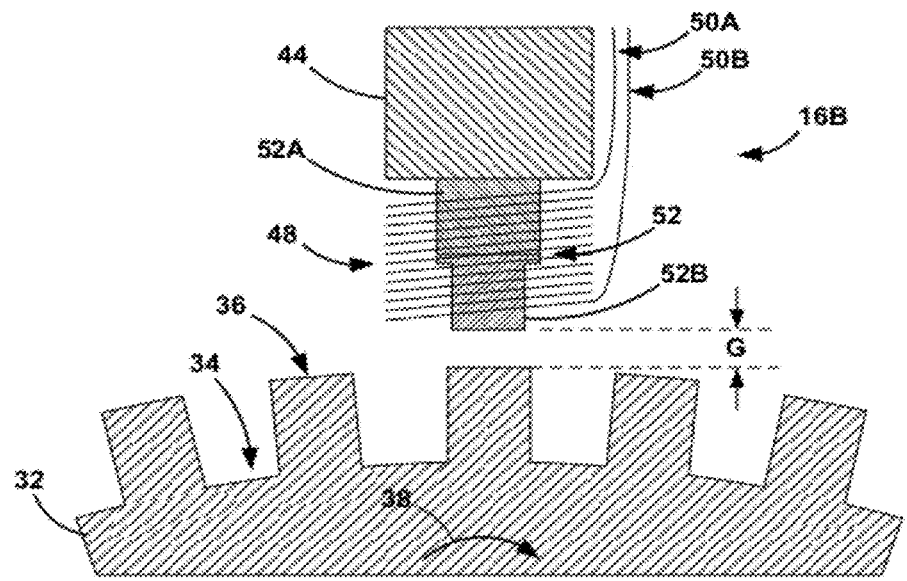

FIGS. 3A and 3B are conceptual diagrams of various configurations of induction module 16. FIG. 3A illustrates example induction module 16A that provides magnetic core 46 of a single diameter. In contrast, FIG. 3B illustrates example induction module 16B that provides magnetic core 52 with a smaller distal diameter. In either example, induction modules 16A and 16B produce an electrical current with the rotation of target 32.

As shown in FIG. 3A, induction module 16A includes support structure 44, magnetic core 46, and coil 48. Magnetic core 46 is attached to support structure 44. Support structure 44 may be electrical and/or magnetically insulative so as to now interfere with the magnetic field or induced electrical voltage. Magnetic core 46 may include two distinct structures of permanent magnet 46A and magnetic pole 46B. Permanent magnet 46A may produce a magnetic field and magnetic pole 46B may be a piece of ferromagnetic material that interacts with the passing teeth 36 of target 32. Permanent magnet 46A may be generally proximal distal of sensing module 18 and magnetic pole 46B may be attached to permanent magnet 46A and generally distal of permanent magnet 46A.

The diameter of permanent magnet 46A may be substantially equal to the diameter of magnetic pole 46B. Coil 48 is created by winding electrically conductive wire around the perimeter of magnetic core 46. Coil 48 may be made up of at least several turns of wire, but in some examples, the wire may be wound around coil 48 hundreds or even thousands of times. For example, coil 48 may include approximately 5,000 turns of wire. Coil 48 may also include circuit lead 50A and circuit lead 50B that couples coil 48 to circuitry of sensor 12. Coil 48 may constructed of copper enameled wire, silver wire, or any other electrically conductive material.

Coil 48 may be wound within a bobbin (not shown) or other insulating structure within which magnetic core 46 may be placed. Alternatively, coil 48 may be placed immediately adjacent to magnetic core 46. In some examples, coil 48 may surround substantially all of magnetic core 46, e.g., both permanent magnet 46A and magnetic pole 46B. In other examples, a portion of magnetic core 46 may extend out beyond coil 48, e.g., distal of coil 48. In other words, a distal end of magnetic core 46 may be closer to target 32 than any portion of coil 48. Coil 48 may be configured such that all or only a portion of magnetic pole 46B is exposed beyond coil 48. Although coil 48 may completely cover permanent magnet 46A, some examples of induction module 16A may position permanent magnet 46A at least partially outside of coil 48.

Induction module 16A of sensor 12 may be positioned such that there is an air gap G between the distal end of magnetic core 46 and the edge of teeth 36. Generally, a larger electrical voltage may be induced in coil 48 with smaller air gaps G. However, an air gap too small may cause undesirable contact between teeth 36 of target 32 and induction module 16. As target 32 rotates in the direction of arrow 38, teeth 36 and gaps 34 alternate passing near induction module 16. Since target 32, or at least a portion of teeth 36, is constructed of a ferromagnetic material, the magnetic flux changes with each passing of one of teeth 36. This change in flux induces the electrical voltage in coil 48. The faster the magnetic flux changes, the more power sensor 12 may be capable of generating from the induced voltage.

FIG. 3B illustrates induction module 16B that is substantially similar to induction module 16A of FIG. 3A. However, magnetic core 52 may be shaped to include different diameters. For example, magnetic pole 52B may include a smaller diameter at the distal end that is closer to target 32 than a larger diameter at the proximal end of magnetic pole 52B. The larger diameter of magnetic pole 52B may be substantially similar to the diameter of permanent magnet 52A. This "shaped core" of magnetic core 52 may improve the magnetic flux change and linkage to passing teeth 36 to increase the efficiency of converting magnetic flux changes to electrical voltage in coil 48.

In some examples, magnetic pole 52B may be configured with a uniform diameter that is smaller than a uniform diameter of permanent magnet 52A. In other examples, one or both of magnetic pole 52B and permanent magnet 52A may be shaped with a continuous profile, e.g., curved or sloped transitions between each diameter, to provide a desired magnetic field and flux change based on teeth 36 of target 32.

In either examples of induction module 16A or 16B, the diameter of one or both of the permanent magnet and the magnetic pole may be selected based on the pitch of teeth 36, width of teeth 36, the material of teeth 36, anticipated speed target 32, and/or any other feature of target 32. In this manner, magnetic core 46 or 52, or other components of sensor 12, may be selected to maximize energy generation from target 32. For example, energy may be maximized by increasing the magnetic flux linkage between the magnetic core and the target or the rate of magnetic flux change.

Figure 4A:
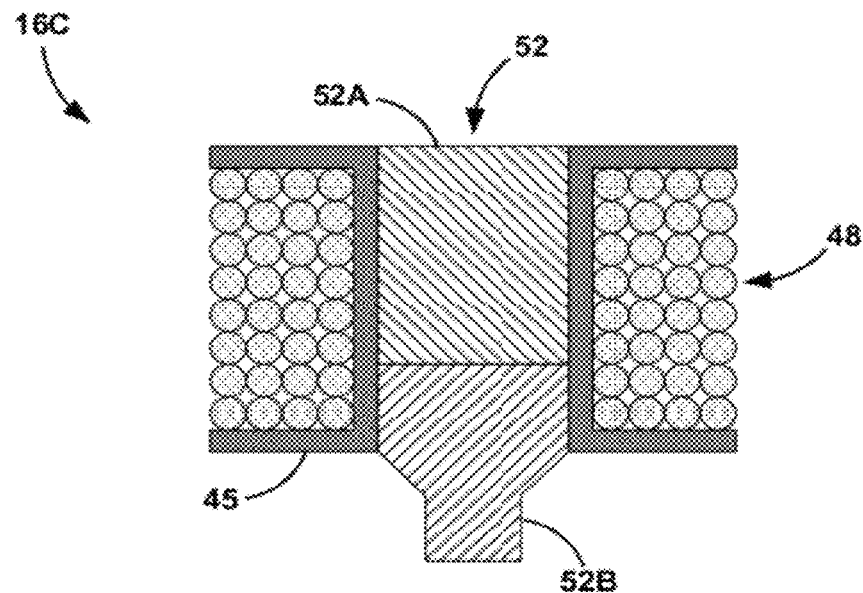
FIGS. 4A and 4B are conceptual diagrams of cross-sections of one coil and two coil configurations, respectively, of different induction modules.
Figure 4B:
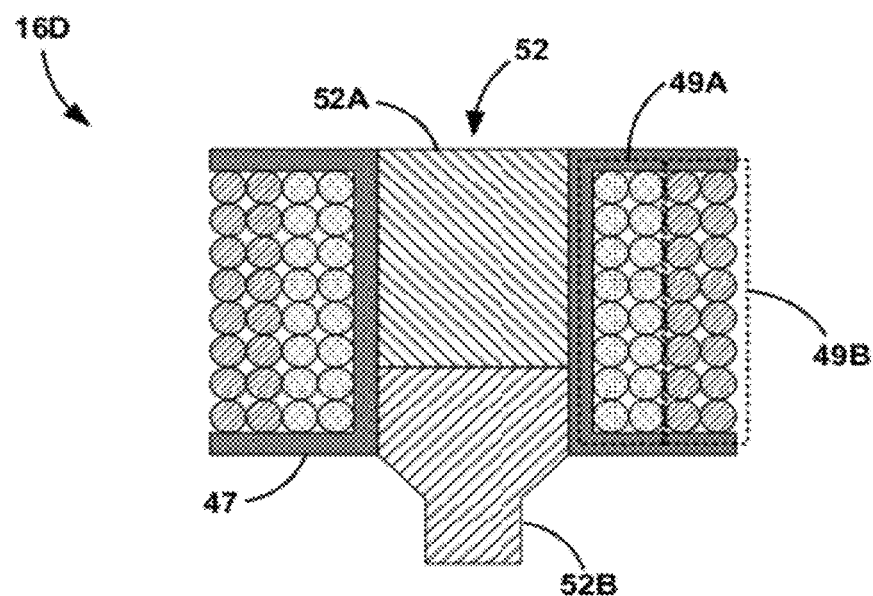

FIGS. 4A and 4B are conceptual diagrams illustrating cross-sections of one coil and two coil configurations, respectively, of different induction modules 16C and 16D. Induction modules 16C and 16D may be incorporated with any of induction modules 16, 16A, or 16B described herein. Induction module 16C of FIG. 4A includes a single coil 48, and induction module 16D of FIG. 5B includes coils 49A and 49B.

As shown in FIG. 4A, induction module 16C includes magnetic core 52, bobbin 45, and coil 48. Similar to FIG. 3B, magnetic core 52 shown in FIG. 4A includes permanent magnet 52A and shaped magnetic pole 52B. Coil 48 is generally a continuous length of wire such that any electrical voltage induced in coil 48 travels is a singular circuit of the wire of coil 48. In this manner, the electrical voltage from coil 48 may be used to both sense the speed of the target and generate power to operate sensor 12 and or recharge the power source.

Bobbin 45 is used to house the wound wire of coil 48. Bobbin 45 may be constructed of plastic or any other electrical insulating material. Bobbin 45 may generally be any structure that fits around at least a portion of magnetic core 52 to retain coil 48 in its desired shape, e.g., a cylinder. Bobbin 45 may have a shape generally defined as including two discs at both ends and a hollow tube connecting each disc, such that the wire is wrapped around the hollow tube and between the two discs. In some examples, bobbin 45 may enclose the outside of coil 48 to ensure containment of the wire.

Induction module 16D of FIG. 4B may be substantially similar to induction module 16C of FIG. 4A. However, induction module 16D may include two coils of wire. Bobbin 47 may be constructed to contain and house coil 49A and coil 49B. Coil 49A may be constructed of a continuous length of wire, and coil 49B may be constructed of a different continuous length of wire. In this manner, coil 49A and coil 49B may be part of two different circuits. For example, the electrical voltage induced in inner coil 49A may be used by energy scavenging module 22 to generate power to recharge the rechargeable power source. Conversely, the electrical voltage induced in outer coil 49B may be used by sensing module 18 to detect the changes in magnetic flux and speed of the target. In this manner, sensor 12 may utilize separate voltages instead of splitting the electrical voltage from one coil 48. In other examples, outer coil 49B may be used to generate power while inner coil 49B may be used to sense the speed of the target.

Coils 49A and 49B may be in direct contact with each other or separated by an insulating structure. Generally, inner coil 49A may be used to generate power since the induced voltage may be stronger than outer coil 49B. In other examples, coils 49A and 49B may be wound within bobbin 47 such that the two wires of each coil are interleaved or interwoven with each other. The electrical voltage generated in each coil may thus be approximately equivalent. In an interwoven configuration of coils 49A and 49B, the two wires of each coil may alternatively include an insulating sleeve to provide electrical isolation between each wire.

Coils 49A and 49B may be similar in the number of turns of wire, may differ in the number of turns of wire, or may even differ in the type of wire used. Since the purposes of coils 49A and 49B may be different, the configuration of each coil may be selected to achieve desired amounts of power generation, target sensing, or both. For example, coils 49A and 49B may even be configured such that one coil is located distal of the other coil. In this configuration, coils 49A and 49B may be separated by axial position instead of radial position as shown in FIG. 4B. Furthermore, other examples of inductive module 16D may include more than two coils.

Figure 5:
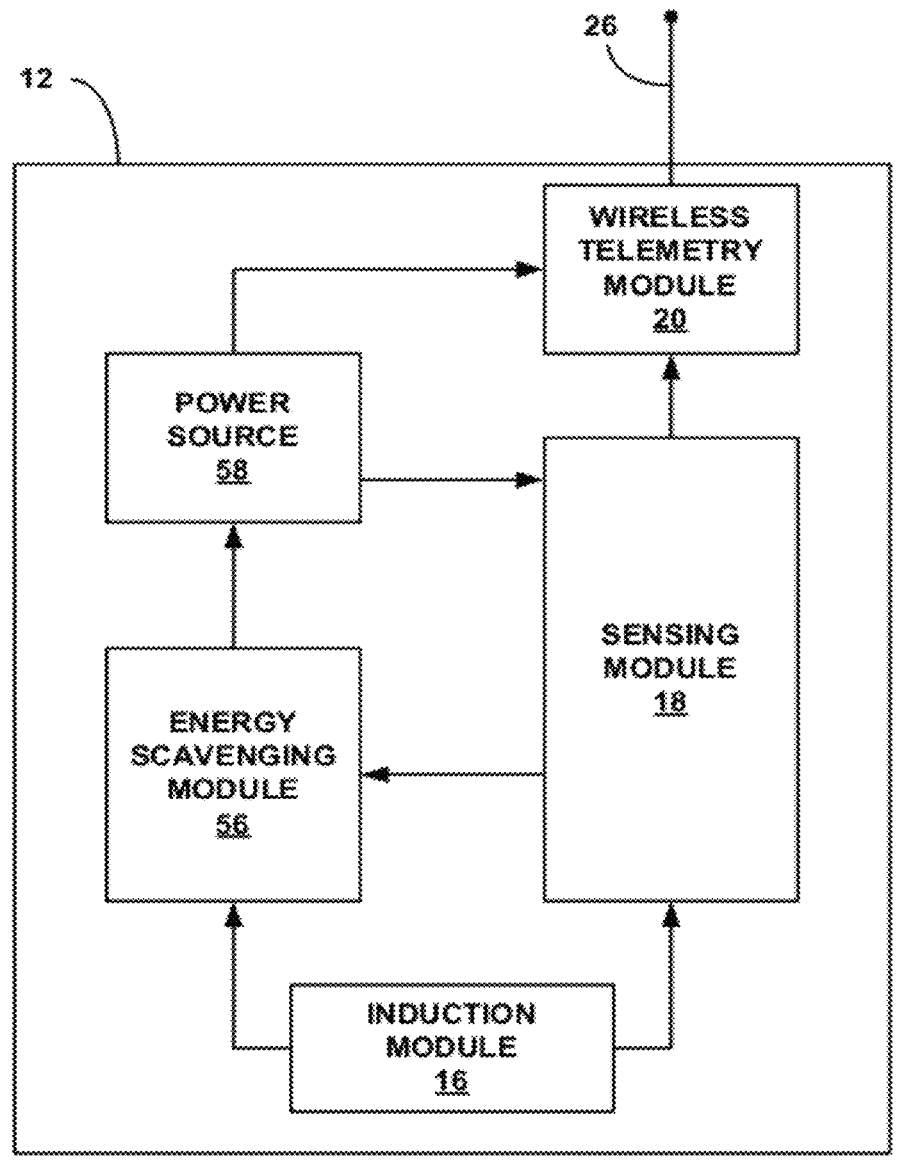
FIG. 5 is a block diagram of the example sensor of FIG. 1.

FIG. 5 is a block diagram of the example sensor 12 of FIG. 1. As shown in FIG. 5, sensor 12 includes induction module 16, sensing module 18, wireless telemetry module 20, antenna 26, energy scavenging module 56, and power source 58. As described herein, induction module 16 may include a magnetic core and coil of wire that induces an electrical voltage in the wire as the target passes near induction module 16. The induced electrical voltage is then utilized to sense the speed of the target and generate power to recharge power source 58. Together, energy scavenging module 56 and power source 58 may be similar to energy scavenging module 22 of FIG. 1. Any of the modules described herein may be implemented by one or more analog circuits, digital circuits, microcontrollers, processors, or any other logic circuits as appropriate.

Since magnetic flux is changing direction in induction module 16 with rotation of the target, the induced electrical voltage is an alternating voltage (AC). Based on the frequency of the AC signal, sensing module 18 may include an analog or digital circuit that determines the speed of the target. Sensing module 18 may be calibrated to use known tooth widths and target diameter to generate a linear or angular speed based on the detected frequency of the magnetic flux change. This calibration information may be stored in a memory (not shown) located within sensing module 18. Alternatively, sensing module 18 may merely send the detected frequency to wireless telemetry module 20 for transmission and later calibration into target speed by the receiving computing device. Sensing module 18 may also include one or more signal conditional circuits, e.g., analog circuits or a microprocessor, that process the signal to determine the frequency of magnetic flux change.

The alternating voltage induced in induction module 16 may also be received by energy scavenging module 56. Energy scavenging module 56 may include one or more circuits to convert the AC voltage into direct voltage (DC) usable to recharge power source 58 and/or operate the modules of sensor 12. Energy scavenging module 56 may also include a filter and DC to DC converter to condition the signal and step the voltage to a voltage appropriate for recharging power source 58. The direct voltage is then used to recharge the rechargeable power source 58. Power source 58 may be a rechargeable battery, capacitor, or any other device capable of storing power in sensor 12.

Energy scavenging module 56 may also include a variable load that maintains a desired voltage of the DC signal. Since the voltage induced in induction module 16 changes with the speed of the target, the voltage may also vary with operation of sensor 12. However, energy scavenging module 56 may be capable of generating the most power at a predetermined voltage. Therefore, the variable load may adjust the resistance within the circuit as an attempt to maintain the voltage for optimal power generation.

In some examples, sensing module 18 may control the variable load based on the detected speed of the target. In this manner, sensing module 18 may also include circuitry or other controllers that send control signals to energy scavenging module 56. For example, sensing module 18 may increase the variable load at lower target speeds to maximize voltage and decrease the variable load at higher target speeds to reduce the voltage to the optimal power generation voltage. In other examples, energy scavenging module 56 may include a circuit, e.g., a DC-to-DC converter, that automatically steps the incoming voltage to the desired voltage for power generation. In this manner, energy scavenging module 56 may regulate the output voltage used to generate power stored in power source 58.

In turn, power source 58 may provide operational power to sensing module 18 and wireless telemetry module 20. Sensing module 18 may include a processor or other integrated circuit that utilizes a voltage to determine the speed of the target. Wireless telemetry module 20 may utilize power to generate a transmission signal based on the data to be transmitted and amplify the transmission signal. The transmitted data may include the speed of the target, the frequency of magnetic flux change, a charge status of power source 58, a rate of power source depletion, or any other operational information.

Sensor 12 may also comprise a mechanism for restarting the circuitry of sensor 12 upon a depletion of power source 58 below operational limits. After a voltage of rechargeable power source 58 drops below a shut-down threshold, sensing module 18 may be configured to initiate a power up sequence upon the frequency of the change in magnetic flux exceeding a start-up threshold. In other words, once the target is inducing an electrical voltage sufficient to operate sensor 12, sensing module 18 may be capable of automatically resuming sensing and wireless transmission of data. In some examples, sensing module 18 may additionally wait until the charge level of power source 58 reaches a predetermined minimum charge level before initiating wireless telemetry module 20.

Wireless telemetry module 20 may transmit data using radio frequency or transmission mediums. For example, wireless telemetry module 20 may utilize any type of radio frequency telemetry or communication protocol, e.g., IEEE 802.11, frequency-hopping spread spectrum, or any other networked or direct communication technique. In some examples, the signal transmitted by wireless telemetry module 20 may be encrypted or secured to prevent detection by unauthorized devices.

Figure 6:
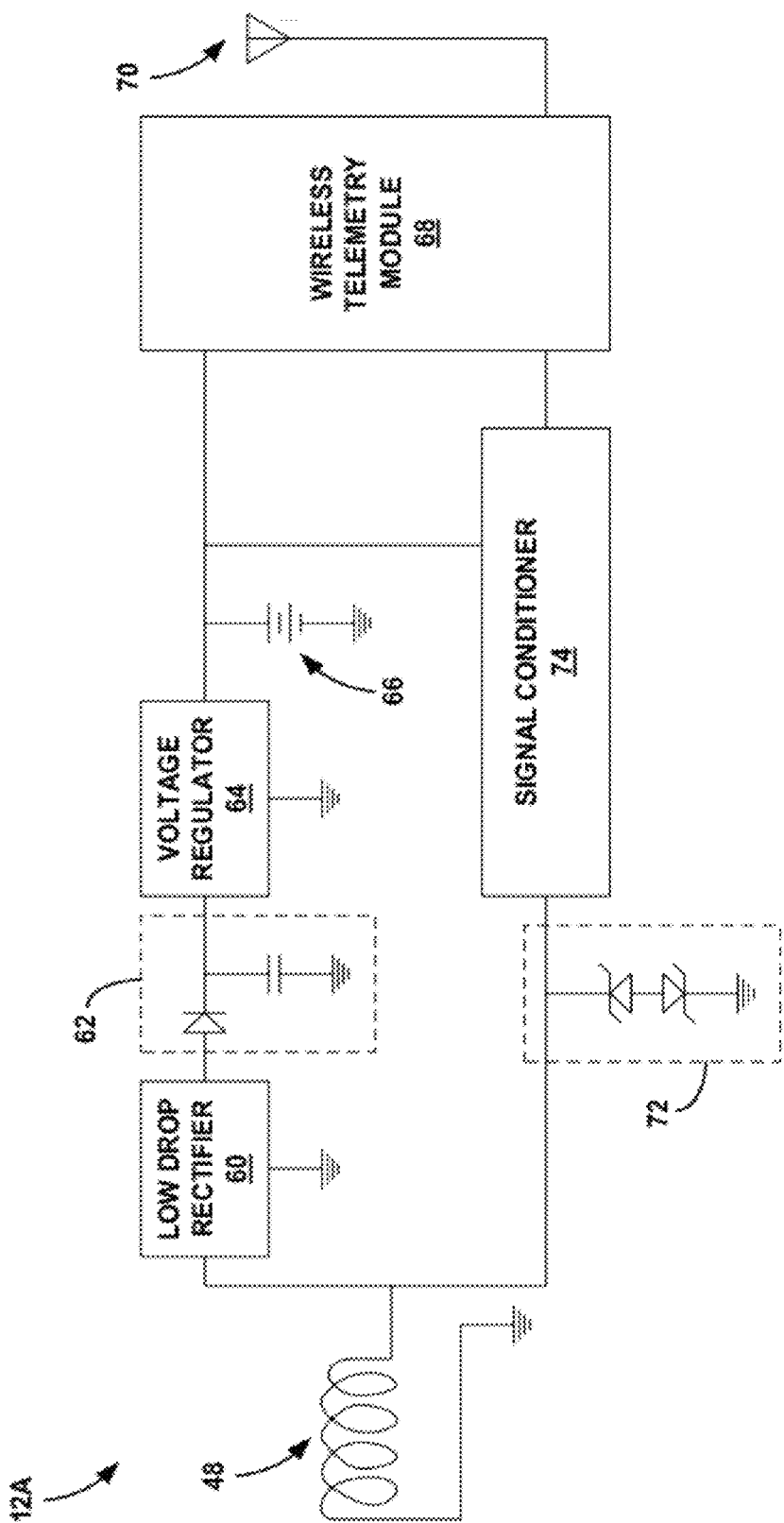
FIG. 6 is a schematic diagram of example circuitry within a sensor utilizing a one coil configuration.

FIG. 6 is a schematic diagram of example circuitry within sensor 12A utilizing a one coil configuration. Sensor 12A may be an example of sensor 12 described in FIG. 1. As shown in FIG. 6, sensor 12A includes coil 48, overvoltage limiter 72, signal conditioner 74, wireless telemetry module 68, antenna 70, low drop rectifier 60, filter 62, voltage regulator 64, and rechargeable battery 66. Sensor 12A generates power and detects the speed of the target with a single coil 48.

The induced electrical voltage in coil 48 flows to signal conditioner 74. However, prior to signal conditioner 74, overvoltage limiter 72 may provide high voltage protection to signal conditioner 74. Overvoltage limiter 72 may include back to back zener diodes that allow voltage to pass only if the voltage of the signal exceeds the threshold voltage of each zener diode. Signal conditioner 74 may include one or more analog or digital filters used to extract the frequency of changing magnetic flux from the signal and present the frequency as transmittable data to wireless telemetry module 68. Signal conditioner 74 may include a processor that calculates the speed of the target or sends a control signal to voltage regulator 64 to adjust the load based on the target speed, for example.

The induced electrical voltage in coil 48 also flows to low drop rectifier 60. Low drop rectifier 60 converts the alternating voltage from coil 48 to a direct voltage usable to charge rechargeable battery 66. Filter 62 then filters predetermined frequencies from the direct voltage signal. Filter 62 may include a diode and a capacitor, e.g., an electrolytic capacitor, selected to deliver a desired signal to voltage regulator 64.

Voltage regulator 64 may regulate the output voltage to rechargeable battery 66. Voltage regulator 64 may be selected to output the voltage that is capable of generating the most power from the induced electrical voltage. In this manner, voltage regulator 64 may also act as a maximum power tracker. Voltage regulator 64 may be an active regulator, e.g., a linear regulator or switching regulator, to vary the output voltage based on the voltage or voltage of the induced electrical signal. In some examples, the output voltage from voltage regulator 64 may be controllable by one or more microcontrollers. For example, the microcontroller may select an output voltage that will generate the most power based on either the speed of the target or the induced electrical signal. In this manner, sensor 12A may provide a variable load that may optimize the generated power from the induced electrical voltage in coil 48.

The power generated by the regulated voltage is then used to recharge battery 66. Battery 66 may be a rechargeable battery, capacitor, or any other power source capable of storing a charge for use in operating the circuits of sensor 12A, e.g., wireless telemetry module 68. Power from battery 66 may continuously deliver power to the components of sensor 12A, or the voltage provided by coil 48 may be used to power sensor 12A if battery 66 has been depleted or is fully charged.

Wireless telemetry module 68 may then periodically, or on demand, transmit data via antenna 70. The transmitted data may include the frequency of change in magnetic flux, speed of the target, the charge status of battery 66, the rate of charge depletion or storage in battery 66, or any other operational parameters of sensor 12A. Although wireless telemetry module 68 may generally only transmit data, in other examples, wireless telemetry module 68 may be capable of receiving data as well. For example, wireless telemetry module 68 may receive information related to updated calibration algorithms to detect the speed of the target, requests to send specific data, changes to firmware regarding the control of voltage regulator 64 or the method of conditioning the induced electrical signal, or any other operational information. As described herein, wireless telemetry module 68 may generally operate using a radio frequency technology commonly known in the art.

In other examples, sensor 12A may include more or fewer components and still detect the speed of the target and generate power from the same electrical voltage induced in coil 48. For example, different filters or protection circuits may be used, and these alternatives are also contemplated.

Figure 7:
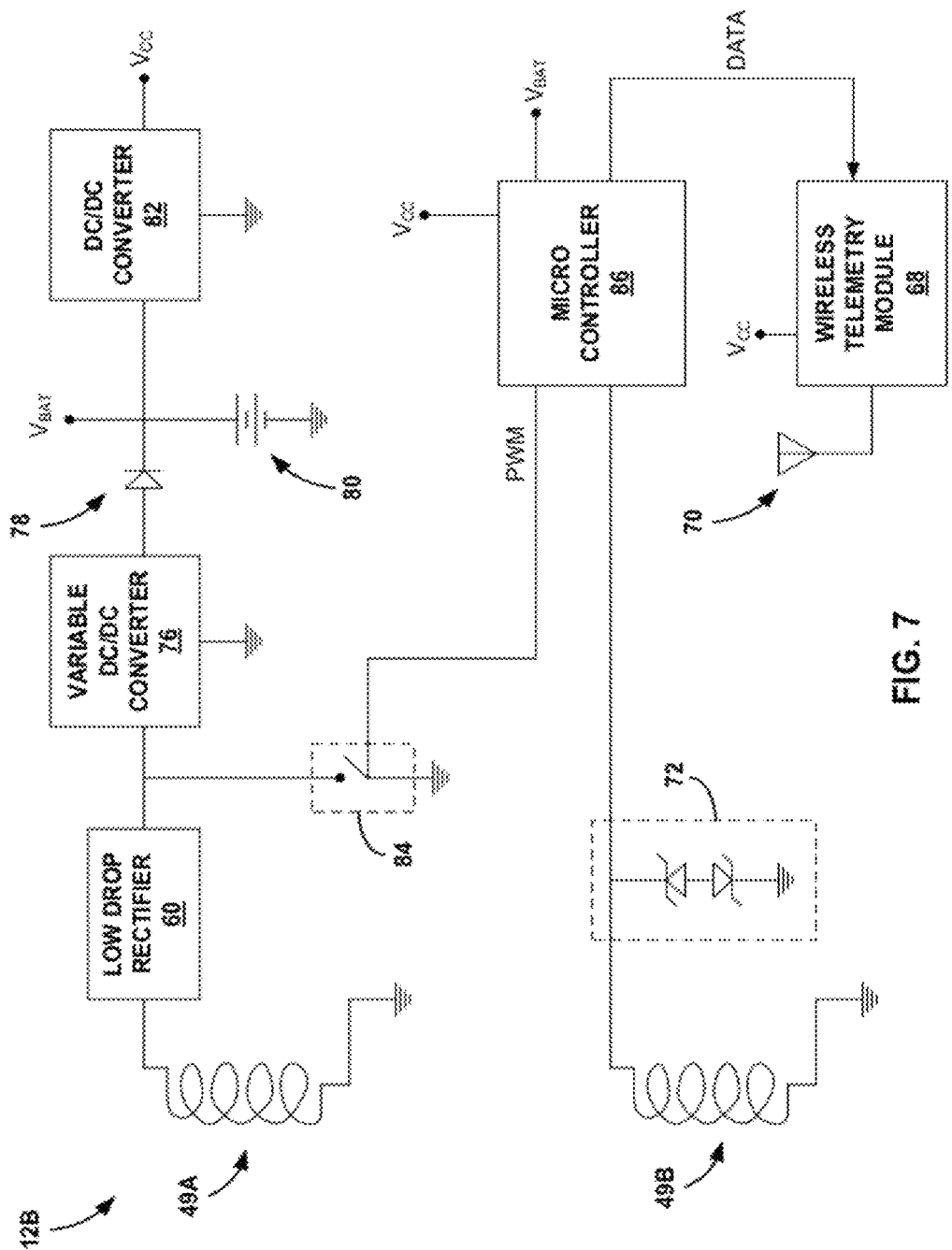
FIG. 7 is a schematic diagram of example circuitry within a sensor utilizing a two coil configuration.

FIG. 7 is a schematic diagram of example circuitry within sensor 12B utilizing a two coil configuration. Sensor 12B may be an example of sensor 12 described in FIG. 1, and sensor 12B may include similar components to sensor 12A of FIG. 6. As shown in FIG. 7, sensor 12B includes coils 49A and coils 49B of FIG. 4B, as an example two coil configuration. From coil 49A, sensor 12B includes low drop rectifier 60, shunt switch 84, variable DC/DC converter 76, diode 78, rechargeable battery 80, and DC/DC converter 82. From coil 49B, sensor 12B also includes overvoltage limiter 72, microcontroller 86, wireless telemetry module 68, and antenna 70. Sensor 12B may generate power from coil 49A and detect the speed of the target with coil 49B.

The induced electrical voltage in coil 49A flows to low drop rectifier 60. Low drop rectifier 60 converts the alternating voltage from coil 49A to a direct voltage usable to charge rechargeable battery 80. In some examples, a filter may be provided after low drop rectifier 60, similar to filer 62 of FIG. 6. The direct voltage then flows to variable DC/DC converter 76. Variable DC/DC converter 76 may convert the voltage of the DC signal to a voltage that maximizes the available power to most efficiently charge battery 80. Variable DC/DC converter 76 may perform a function similar to that of voltage regulator 64 in FIG. 6. Variable DC/DC converter 76 may be a linear or switched-mode converter, for example, to vary the output voltage. Shunt switch 84 may allow microcontroller 86 to provide pulse width modulation of the DC signal and modulate the output voltage from variable DC/DC converter 76. Microcontroller 86 may open or close shunt switch 84 based on the detected speed of the target and/or the voltage detected from battery 80, $V_{BAT}$. In this manner the voltage from variable DC/DC converter 76 may be variable, to produce the most power from the available voltage induced in coil 49A.

In other examples, the output voltage from variable DC/DC converter 76 may be directly controllable by microcontroller 86. For example, the microcontroller may directly vary the load of variable DC/DC converter 76. Alternatively, microcontroller 86 may operate multiple switches, a multiplexer, or other device to direct the voltage from low drop rectifier to the appropriate voltage regulator to maximize power generated by sensor 12B.

After battery DC/DC converter 76, the voltage passes though diode 78 and may be used to charge rechargeable battery 80. Battery 66 may be a rechargeable battery, capacitor, or any other power source capable of storing a charge for use in operating the circuits of sensor 12B, e.g., wireless telemetry module 68 and microcontroller 86. Power from battery 66 may continuously deliver power to the components of sensor 12B, or the voltage provided by coil 49A may be used to power sensor 12B if battery 66 has been depleted or is fully charged. The voltage from battery 80, $V_{BAT}$, may be sent to microcontroller 86 to monitor the charge status and/or transmit the battery voltage via wireless telemetry module 68. DC/DC converter 82 may also regulate the voltage of the power from battery 80 used to operate microcontroller 86, $V_{CC}$.

The induced electrical voltage in coil 49B is used to detect the speed of the target. An overvoltage limiter 72 may provide high voltage protection to microcontroller 86. Overvoltage limiter 72 may include back to back zener diodes that allow current to pass only if the voltage of the signal exceeds the threshold voltage of each zener diode. Microcontroller 86 may then receive the AC voltage signal from coil 49B and extract the frequency of the magnetic flux change. In this manner, microcontroller 86 may employ one or more filters, amplifiers, and other circuits to condition the signal and extract the desired frequency. Although microcontroller 86 may detect the frequency from the analog signal, an analog to digital converter may be provided to send digital signals to microcontroller 86 for processing. Microcontroller 86 may then process the frequency into data for transmission, e.g., apply the frequency to a calibration algorithm that determines the speed or angular velocity of the target. Microcontroller 86 may also receive the voltage of $V_{BAT}$ to modulate the voltage and/or current used to charge battery 80, operate shunt switch 84, or process the voltage for transmission via wireless telemetry module 68.

Microcontroller and wireless telemetry module 68 may operate with the voltage, $V_{CC}$, provided by battery 80. Wireless telemetry module 68 may periodically, continuously, or on demand, transmit data via antenna 70. The transmitted data may include the frequency of change in magnetic flux, speed of the target, the charge status of battery 80, the rate of charge depletion or storage in battery 80, or any other operational parameters of sensor 12B. Although wireless telemetry module 68 may generally only transmit data, in other examples, wireless telemetry module 68 may be capable of receiving data as well. For example, wireless telemetry module 68 may receive information related to updated calibration algorithms to detect the speed of the target, requests to send specific data, changes to firmware of microcontroller 86, or any other operational information. As described herein, wireless telemetry module 68 may generally operate using a radio frequency technology commonly known in the art.

In other examples, sensor 12B may include more or fewer components and still generate power from the electrical voltage induced in coil 49A and detect the speed of the target from the electrical voltage induced in coil 49B. For example, different filters, protection circuits, or controllers may be used, and these alternatives are also contemplated.

Figure 8:
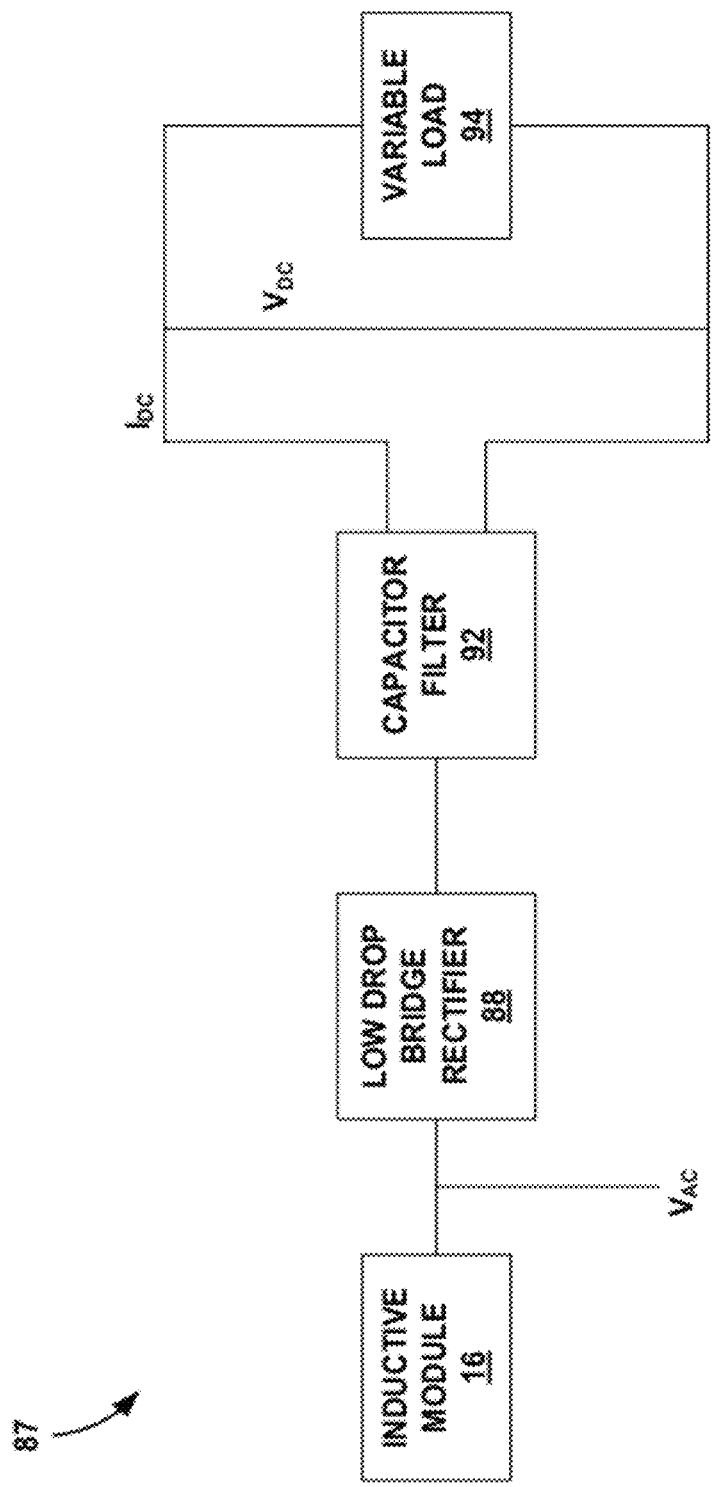
FIG. 8 is a schematic diagram of an example test circuit that scavenges energy using a variable load to optimize recharging power.

FIG. 8 is a schematic diagram of an example test circuit 87 that includes variable load 94 to optimize recharging power. Test circuit 87 may be used to determine voltages and power capable of being produced by inductive module 16. Some of the data generated with test circuit are shown in FIGS. 9, 10, 11, and 12. However, the data of FIGS. 9, 10, 11, and 12 may be substantially similar to some configurations of a fully operational sensor 12.

As shown in FIG. 8, test circuit 87 includes inductive module 16, low drop bridge rectifier 88, capacitor filter 92, and variable load 94. The electrical voltage induced in inductive module 16 is an AC voltage, $V_{AC}$, that is converted to a DC voltage by low drop bridge rectifier 88. The DC voltage is then filtered by capacitor filter 92. Variable load 94 may be varied or otherwise adjusted to increase or decrease the voltage, $V_{DC}$, to maximize or optimize the available power to charge a rechargeable battery. In this manner, test circuit 87 may provide a simplified circuit for scavenging the most power from electrical voltage induced in inductive module 16 from the speed of the target.

Figure 9:
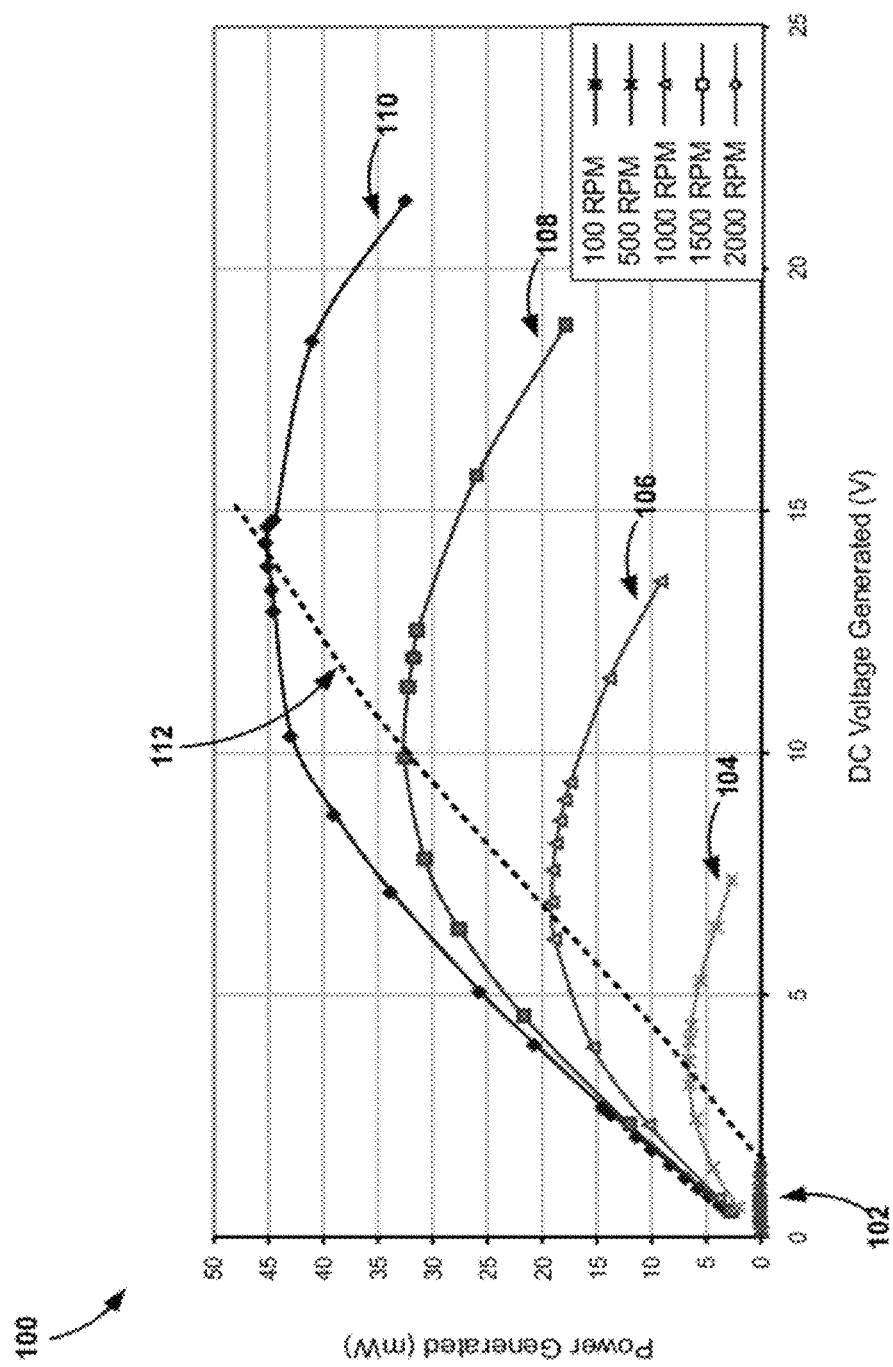
FIG. 9 is a graph of example power generated with various voltages under different target speeds.

FIG. 9 includes graph 100 of example power generated with various voltages under different target speeds. As shown in FIG. 9, graph 100 indicates that the maximum amount of power that may be generated by sensor 12 may vary based on the DC voltage generated from the changes in magnetic flux within the induction module. In other words, varying the variable load in the energy scavenging circuit may change the generated DC voltage and the resulting power generated by sensor 12. Graph 100 illustrates power curves generated from five different rotational speeds of the target, e.g., target 32. To generate the data of graph 100, an example sensor 12 included 5000 turns in inductive coil 48 with an air gap of 0.5 mm between sensor 12 and a 40 tooth target 32. Since voltage and power may vary based on sensor design, gaps between sensor 12 and target 32, ambient temperature, target tooth size and gaps, or other variables, relationships between voltage and power may vary between sensors. Therefore, graph 100 only provides example power curves from one example sensor configuration.

Power curve 102 was generated at approximately 100 revolutions per minute (RPM) of target 32, power curve 104 was generated at approximately 500 RPMs, power curve 106 was generated at approximately 1,000 RPMs, power curve 108 was generated at approximately 1,500 RPMs, and power curve 110 was generated at approximately 2,000 RPMs. Power curve 102 indicates that approximately zero power was generated at such a low target velocity, but power curve 104 indicates that enough power may be generated at 500 RPM to operate sensor 12 and possibly recharge a power supply of sensor 12.

Graph 100 generally indicates that higher target velocity generates higher DC voltage. This higher DC voltage may be used by the energy scavenging circuit to more quickly recharge a battery or capacitor used as a power source in sensor 12. Power curves 104, 106, 108, and 110 also indicate that there may be an optimal voltage to generate the greatest power at each target velocity. From collected data, optimal curve 112 indicates the voltage for each target velocity that corresponds to the maximum power that sensor 12 may generate using that respective target velocity. For example, a DC voltage of approximately 10 volts may produce the maximum 32 milliwatts (mW) with a target velocity (i.e., speed) of approximately 1,500 RPM.

Sensing module 18, for example, may detect the target velocity and automatically control energy scavenging module 56 to adjust the variable load to maximize the generated power. Sensing module 18 may utilize a look-up table or stored equation indicative of optimal curve 112, for example, to adjust the variable load. In other examples, sensing module 18 may include an intelligent circuit that monitors the generated power and periodically, or continuously, adjusts the variable load to account for the target velocity, ambient temperature, power usage, energy storage, or any other characteristics of sensor 12. In any configuration of sensor 12, the variable load of sensor 12 may generally be adjusted to maximize or optimize the generated power from the available target velocity. In other words, sensing module 18 or energy scavenging module 56 may attempt to maintain DC voltages close to optimal curve 112.

Figure 10:
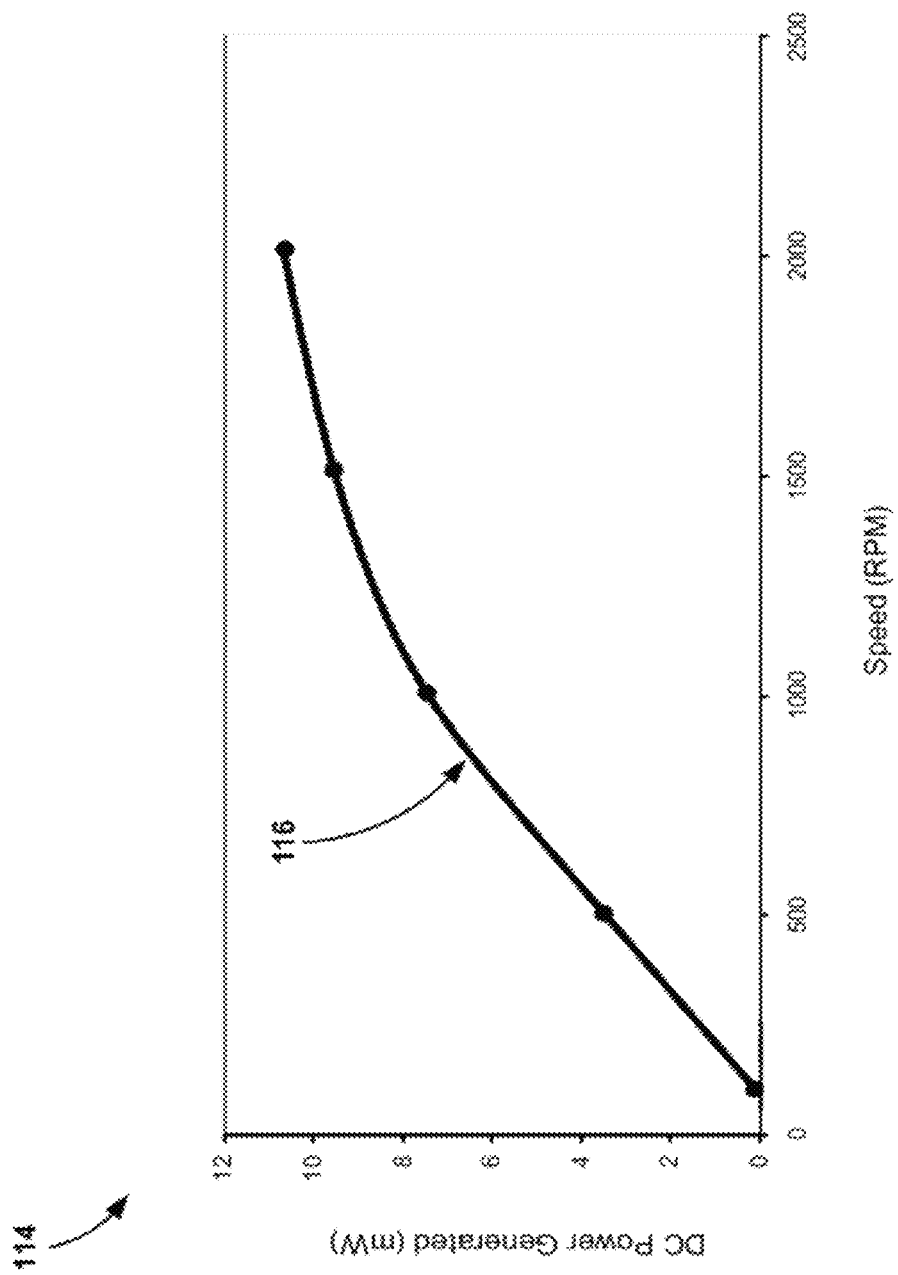
FIG. 10 is a graph of example power generated as a function of target speed.

FIG. 10 includes graph 114 of example power generated as a function of target 32 speed. As shown in FIG. 10, power curve 116 indicates the relationship between speed of the target, e.g., target 32, and generated power for an example configuration of sensor 12. The example sensor 12 used to generate graph 114 may be similar to sensor 12 used to generate data of graph 100 of FIG. 9. Power curve 116 generally indicates that sensor 12 is capable of generating more DC power as the speed of the target increases. Specifically, power curve 116 indicates that the speed of target 32 must exceed a minimum threshold before any power is generated. Then, as generated power increases with target speed, the rate of increase begins to lower when the speed of target 32 is between 1,500 RPM and 2,000 RPM.

Power curve 116 may be used to determine the minimum speed of the target necessary for sensor 12 to operate and/or recharge the rechargeable power source. For example, if sensor 12 requires approximately 7 mW to operate, then target 32 must rotate at or above approximately 1,000 RPM to prevent depletion of stored power in the rechargeable power source. In applications where the target will have a speed greater than this minimum speed, sensor 12 may continue operations during periods that the target rotates as lower speeds.

Figure 11:
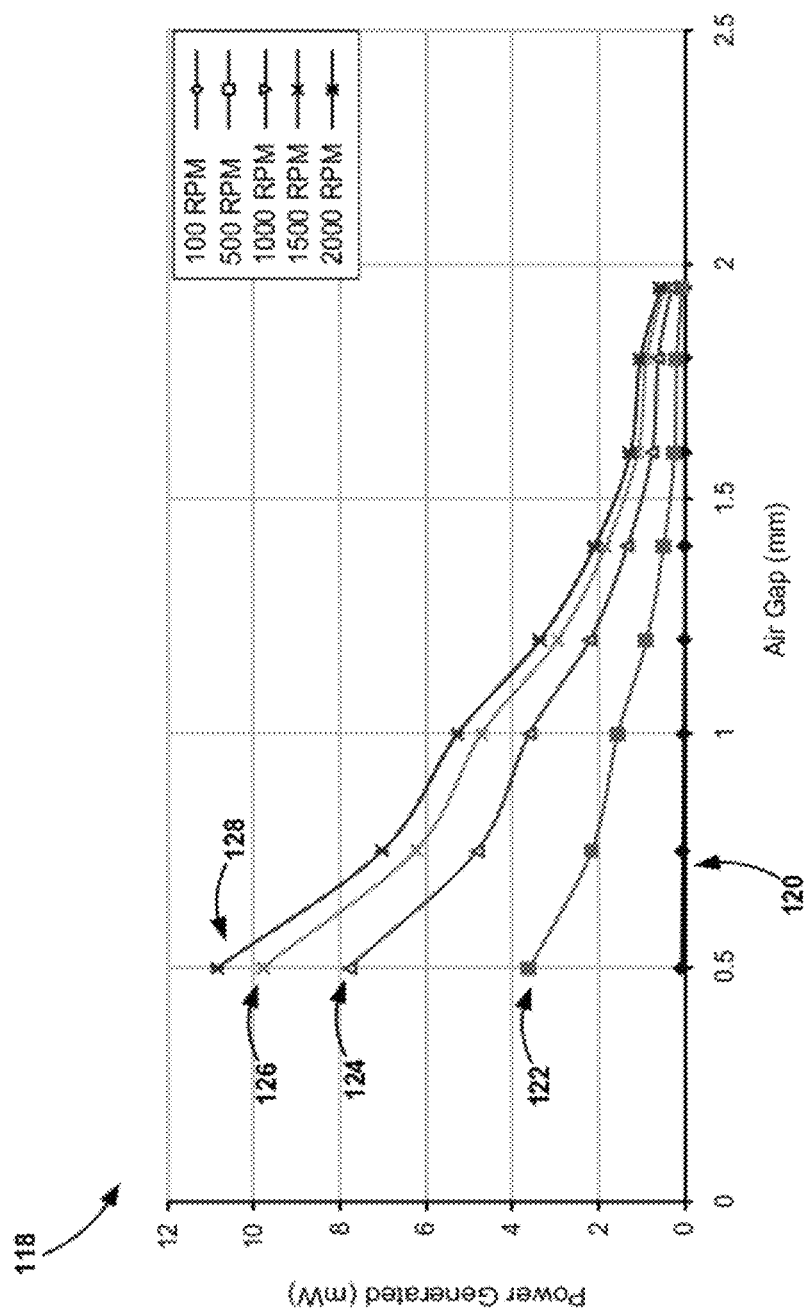
FIG. 11 is a graph of example power generated with various target to sensor gaps under different target speeds.

FIG. 11 includes graph 118 of example power generated with various target to sensor gaps under different target speeds. As shown in FIG. 11, graph 118 includes gap curves 120, 122, 124, 126, and 128 that illustrate example power than can be generated with sensor 12 and various air gaps between induction module 16 and target 32. Gap curve 120 corresponds to almost zero power generated with any width air gap. As shown above with respect to FIG. 9, more power is generated at the speed of target 32 increases from 500 RPM to 2,000 RPM in gap curves 122 and 128, respectively. Gap curves 124 and 126 indicate the power capable of being generated at various air gap widths with a target speed of 1,000 RPM and 1,500 RPM, respectively.

With any speed of target 32, smaller air gaps between sensor 12 and target 32 generally translate into greater power generation capability. For example, gap curve 124 indicates that sensor 12 is capable of generating approximately 8 mW at 1,000 RPM and an air gap width of 0.5 mm. However, increasing the air gap width to approximately 1.5 mm decreases the generated power to approximately 1 mW at a target speed of 1,000 RPM. Therefore, it may be desirable to position induction module 16 of sensor 12 as close as possible to target 32 in order to minimize the width of the air gap and maximize generated power. However, it is noted that the air gap width may need to be large enough to prevent any possible contact between target 32 and sensor 12.

Figure 12:
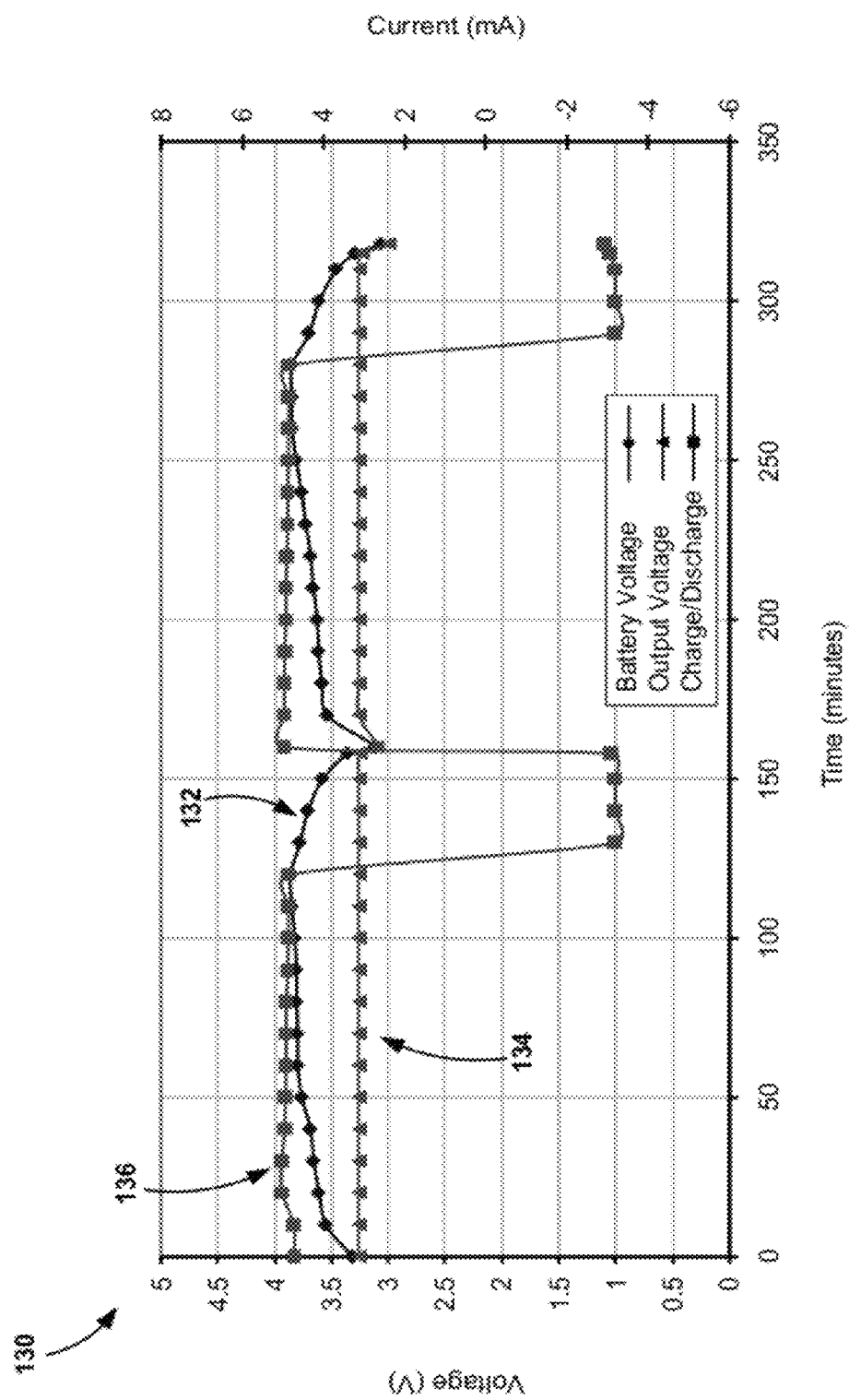
FIG. 12 is a graph of charging and discharging characteristics of an example energy scavenging module and rechargeable power source.

FIG. 12 includes graph 130 of charging and discharging characteristics of example energy scavenging module 56 and rechargeable power source 58. As shown in FIG. 12, graph 130 includes battery voltage 132, output voltage 134, and battery voltage 136. Graph 130 provides voltage for both battery voltage 132 and output voltage 134 and voltage for battery voltage 136. As battery voltage 136 is approximately 4 mA into power source 58, battery voltage 132 increases. This may occur when energy scavenging module 56 is scavenging energy from the induced voltage. If battery voltage 136 decreases such that voltage is flowing out of power source 58, as shown between approximate 120 minutes and 160 minutes, battery voltage 132 decreases accordingly. During this time, energy scavenging module 56 may not be able to generate power from any induced. However, battery voltage 136 then switches back to charging power source 58.

Output voltage 134 from power source 58 stays relatively constant during the time of graph 130. However, output voltage 134 does dip slightly after a substantial drop in battery voltage 132. Depending on the capacity of power source 58, sensor 12 may only be able to operate for limited durations without scavenging energy from the induced voltage. Therefore, sensor 12 may be configured to optimize the power generated from the available voltage and match induction module 16 to the characteristics of the target.

Figure 13:
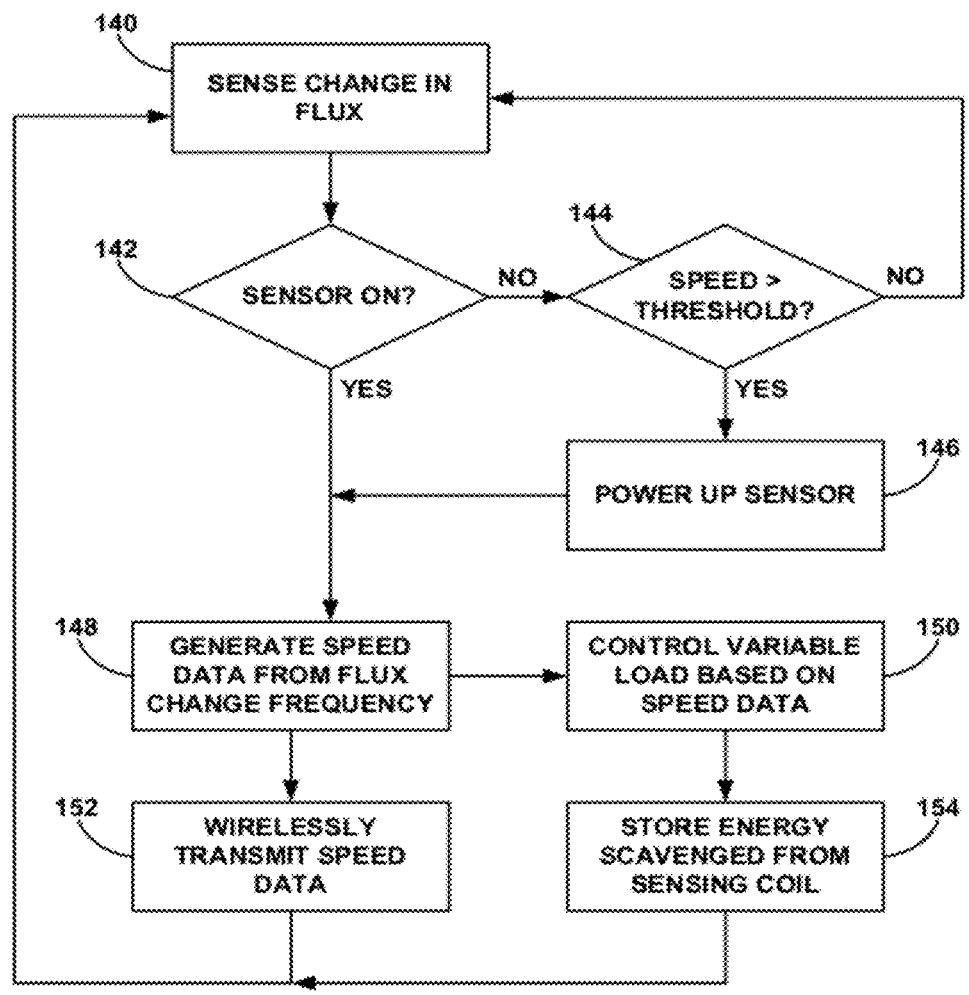
FIG. 13 is a flow diagram of an example technique for scavenging energy with an inductive sensor and wirelessly transmitting sensor data.

FIG. 13 is a flow diagram of an example technique for scavenging energy with inductive sensor 12 and wirelessly transmitting sensor data. Sensor 12 is described for the example of FIG. 13. However, similar techniques may be used for any of sensors 12A, 12B, or variations described herein. As shown in FIG. 13, sensor 12 is capable of shutting down circuitry and automatically initiating a power up sequence once power is again available. Sensing module 18 may continually sense a change in magnetic flux caused by the rotation of target 37 (140). This sensed change may be the identification of an alternating current within the circuit.

If sensor 12 is not currently operational ("NO" branch of block 142), sensing module 18 determines if the speed (or frequency) of the target is exceeds a start-up threshold (144). In other words, the voltage of the rechargeable power source may have dropped below a shut-down threshold such that sensor 12 is only minimally operational. If the target speed is less than the start-up threshold ("NO" branch of block 144), sensing module 18 continues to sense any changes in magnetic flux (140). If the target speed is greater than or equal to the start-up threshold ("YES" branch of block 144), then sensing module 18 may initiate a power up sequence (146). This power up sequence may allow sensor 12 to perform other operations, such as storing power in the power source, storing and retrieving data from a memory, or even wirelessly transmitting data.

Once sensor 12 is operational ("YES" branch of block 142), sensing module 18 generates speed data from the magnetic flux change frequency (148). This speed data may merely be a frequency or a calculated angular velocity, for example. Based on the speed of the target, sensing module 18 may control the variable load to optimize the voltage and available power to charge the power source (150). In other examples, energy scavenging module 22 may independently control the variable load. Energy scavenging module 22 then stores energy from the induced current in the rechargeable power source.

Additionally, wireless telemetry module 20 may transmit the speed data generated from the magnetic flux change frequency (152). Wireless telemetry module 20 may transmit the data continuously, at predetermined intervals, upon any change in speed, upon exceeding any thresholds, or in response to a received request for data. In some examples, wireless telemetry module 20 may additionally transmit operational information from sensor 12, e.g., battery voltage, battery charge rate, power usage, or the remaining operational time from the battery. Sensing module 18 may continue to sense any changes in magnetic flux (140).

Two or more of the operations in FIG. 13 may occur simultaneously. For example, sensing module 18 may control the variable load and generate speed data from the change in magnetic flux. In other examples, sensor 12 may not have defined power up sequences or a speed threshold for initiating sensor 12 operation. Instead, sensor 12 may operate whenever the voltage of the rechargeable battery source is above a threshold level. However, sensor 12 may generate speed data and wirelessly transmit speed data without the use of a power source if energy scavenging module 22 is able to generate enough power to independently operate sensor 12 based on the current induced in induction module 16.

The devices described herein may provide various advantages. For example, a sensor may be able to wirelessly transmit speed data of a target to a remote computing device. The sensor may also be capable of scavenging energy from an electrical current induced by the movement of the target so that the sensor does not rely on any external battery for power. In this manner, the sensor may be able to operate independently of any other wires or devices. Furthermore, the sensor may be able to optimize the voltage for recharging the internal power source by controlling a variable load in the recharging circuit. Although the sensor may be capable of sensing target speed and generating power from a single coil, some examples may include separate induction coils for independently sensing the target speed and generating power.

The techniques described in this disclosure, including those attributed to sensing module 18, wireless telemetry module 20, energy scavenging module 22, energy scavenging module 56, microcontroller 86, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discreet logic circuitry, as well as any combinations of such components. The term "processor" or "microprocessor" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. While the techniques described herein are primarily described as being performed by sensing module 18 or microprocessor 86, any one or more parts of the techniques described herein may be implemented by other processors or circuits within the sensor.

In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

Various embodiments of the invention have been described. For example, a number of examples of speed sensors and features to sense the speed of a target and wirelessly transmit the speed have been described. Although many of the examples have been described in the context of a engine or transmission, the described speed sensors may be useful in a wide variety of other devices and structures. These and other embodiments are within the scope of the following claims.

The invention claimed is:

1. A sensor comprising:
    an induction module configured to generate an electrical voltage induced by a change in magnetic flux within the induction module;
    a sensing module configured to generate data based on a frequency of the change in magnetic flux, wherein the sensing module automatically controls a variable load based on at least one of a magnitude of the induced electrical voltage and the frequency of the change in magnetic flux;
    a wireless telemetry module configured to transmit the data;
    a rechargeable power source; and
    an energy scavenging module configured to recharge the rechargeable power source using at least a portion of the electrical voltage induced by the change in magnetic flux, wherein the energy scavenging module comprises the variable load that adjusts a recharging power from the portion of the electrical voltage that recharges the rechargeable power source.

2. The sensor of claim 1, wherein the induction module comprises a magnetic core configured to produce a magnetic field and one coil of wire wound around the magnetic core and configured to provide the electrical voltage to both the sensing module and the energy scavenging module.

3. The sensor of claim 1, wherein the induction module comprises:
    a magnetic core configured to produce a magnetic field;
    a first coil of wire wound around the magnetic core and configured to provide the electrical current to the energy scavenging module; and
    a second coil of wire, different from the first coil of wire, wound around the magnetic core, and configured to provide a secondary electrical voltage to the sensing module, wherein the secondary electrical voltage is induced by the change in magnetic flux.

4. The sensor of claim 1, wherein the frequency of the change in flux is based on an angular speed and a tooth width of a toothed gear that rotates adjacent to the induction module.

5. The sensor of claim 1, wherein, after a voltage of the rechargeable power source drops below a shut-down threshold, the sensing module is configured to initiate a power up sequence upon the frequency of the change in magnetic flux exceeding a start-up threshold.

6. A method comprising:
    inducing an electrical voltage from a change in magnetic flux within an induction module of a sensor in response to a passing target structure;
    generating data based on a frequency of the change in magnetic flux;
    wirelessly transmitting the data;
    recharging a rechargeable power source using at least a portion of the electrical voltage induced by the change in magnetic flux; and
    controlling a variable load that adjusts a recharging power from the portion of the electrical voltage that recharges the rechargeable power source, wherein controlling the variable load further comprises automatically controlling the variable load based on at least one of a magnitude of the induced electrical voltage and the frequency of the change in magnetic flux.

7. The method of claim 6, wherein inducing the electrical voltage comprises positioning the induction module adjacent to a moving target such that the change in magnetic flux is caused by a magnetic core of the induction module that produces a magnetic field and a single coil of wire of the induction module wound around an axis of the magnetic core, and wherein the single coil of wire provides the electrical current to both recharge the rechargeable power source and generate data based on the frequency of the change in magnetic flux.

8. The method of claim 6, wherein the electrical voltage is a first electrical voltage, further comprising:
    providing the first electrical voltage to recharge the rechargeable power source via a first coil of wire wound around an axis of a magnetic core; and
    providing a secondary electrical voltage to generate data based on the frequency of the change in magnetic flux via a second coil of wire wound around an axis of the magnetic core, wherein inducing the first electrical voltage and the second electrical voltage comprises positioning the induction module adjacent to a moving target such that the change in magnetic flux is caused by a magnetic field produced by the magnetic core.

9. The method of claim 6, wherein the frequency of the change in flux is based on an angular speed and a tooth width of a toothed gear that rotates adjacent to the induction module.

10. The method of claim 6, further comprising wirelessly transmitting an energy balance status that indicates at least one of an energy consumption and a recharging rate of the sensor.

11. A speed sensing device, the device comprising:
means for inducing an electrical voltage from a change in magnetic flux in response to a passing target structure;
means for generating data based on a frequency of the change in magnetic flux; means for wirelessly transmitting the data; and
means for recharging a rechargeable power source using at least a portion of the electrical voltage induced by the change in magnetic flux;
means for varying a load that adjusts a recharging power from the portion of the electrical voltage that recharges the rechargeable power source; and,
means for automatically controlling the means for varying the load based on at least one of a magnitude of the induced electrical voltage and the frequency of the change in magnetic flux.

12. The device of claim 11, wherein the frequency of the change in flux is based on an angular speed and a tooth width of a toothed gear that rotates adjacent to the induction module.

13. The device of claim 11, further comprising, after a voltage of the rechargeable power source drops below a shut-down threshold, means for automatically initiating a power up sequence upon the frequency of the change in magnetic flux exceeding a start-up threshold.

14. The device of claim 11, further comprising means for wirelessly transmitting an energy balance status that indicates at least one of an energy consumption and a recharging rate of the device.

15. The sensor of claim 1, wherein the sensing module automatically initiates a shut-down sequence in response to a voltage of the rechargeable power source dropping below a shut-down threshold.

16. The sensor of claim 1, wherein the sensing module automatically initiates a power-up sequence in response to a change in magnetic flux exceeding a start-up threshold.

17. The method of claim 6, further comprising initiating a shut-down sequence in response to a voltage of the rechargeable power source dropping below a shut-down threshold.

18. The method of claim 6, further comprising initiating a power-up sequence in response to a change in magnetic flux exceeding a start-up threshold.

19. The device of claim 11, further comprising means for initiating a shut-down sequence in response to a voltage of the rechargeable power source dropping below a shut-down threshold.

20. The device of claim 11, further comprising means for initiating a power-up sequence in response to a change in magnetic flux exceeding a start-up threshold.

* * * * *